US008606095B2

(12) United States Patent
Kang et al.

(10) Patent No.: US 8,606,095 B2
(45) Date of Patent: Dec. 10, 2013

(54) CAMERA MODULE HAVING AUTO-FOCUS APPARATUS

(75) Inventors: Byung Hoon Kang, Seoul (KR); Dong Kyun Lee, Seoul (KR); Chuel Jin Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 47 days.

(21) Appl. No.: 13/276,138

(22) Filed: Oct. 18, 2011

(65) Prior Publication Data

US 2013/0094844 A1    Apr. 18, 2013

(51) Int. Cl.
  *G03B 17/00* (2006.01)
  *G02B 7/02* (2006.01)

(52) U.S. Cl.
  USPC ............................................ 396/79; 359/824

(58) Field of Classification Search
  USPC .............................................. 396/79, 125, 529
  See application file for complete search history.

(56) References Cited

U.S. PATENT DOCUMENTS

| 5,675,444 A * | 10/1997 | Ueyama et al. ............... 359/824 |
| 2010/0039718 A1 * | 2/2010 | Nishimiya et al. ............ 359/824 |
| 2012/0154937 A1 * | 6/2012 | Kang et al. .................... 359/824 |

* cited by examiner

*Primary Examiner* — Rodney Fuller
(74) *Attorney, Agent, or Firm* — Ladas & Parry, LLP

(57) ABSTRACT

A camera module having an auto-focus apparatus comprises a piezoelectric actuator configured to generate a force for moving a driven member, a rod connected to the piezoelectric actuator and configured to transmit the force of the piezoelectric actuator to the driven member, a lens barrel having at least one lens, and a connecting member configured to use magnetic force to couple the rod and the lens barrel together.

13 Claims, 8 Drawing Sheets

CAMERA MODULE HAVING AUTO-FOCUS APPARATUS

BACKGROUND OF THE INVENTION

1. Field of the Invention

The present invention relates to a camera module having an auto-focus apparatus.

2. Description of the Related Art

Recently, with the increase in consumer demand for application products for mobile telecommunication terminals, the marketability for application products is largely expanded. In order to meet the various requests of consumers, the technology is moving toward high-performance and multi-function day by day. In particular, research into incorporating auto focus (AF), optical zoom, shutter and anti-shaking functions of the digital camera into the mobile telecommunication terminal has been done. Among these functions, research into the auto-focus and optical zoom has been intensive as the pixel number of the image sensor (CCD & CMOS) increases.

Further, to drive the high-pixel camera module for the mobile telecommunication terminal, a stepping motor, a VCM or a piezoelectric ultrasonic motor is representatively used. In particular, the piezoelectric ultrasonic motor transforms simple vibrations such as the expansion and contraction that occur when electric power is applied to a piezoelectric ceramic, to linear or rotational movement by using friction between stator and rotor. Accordingly, the piezoelectric ultrasonic motor has merits such as higher energy density, rapid response speed, higher positioning accuracy and an off-power holding function compared to electro-magnetic drive motor. In addition, the piezoelectric ultrasonic motor makes no noise when being actuated and the effect thereon of electromagnetic waves is negligible.

More specifically, in the piezoelectric ultrasonic motor, the piezoelectric actuator is coupled to a rod as a power transmission apparatus to which a driven member is coupled. Herein, a coupling means is required for the driven member so as to allow the driving force from the rod to be transmitted thereto. It is also necessary to maintain a suitable level of preload between the rod and the driven member to transmit the driving force of the piezoelectric actuator from the rod to the driven member. Also, it is very important that the lens barrel does not twist or rotate when being driven to secure the tilting performance of a lens.

Hereinafter, an auto-focus function using the piezoelectric ultrasonic motor of the prior art will be described in detail by referring to FIG. 1.

FIG. 1 is a perspective view diagrammatically illustrating an auto-focus apparatus of a camera module incorporating a piezoelectric actuator according to the prior art. As shown in FIG. 1, the piezoelectric actuator includes a piezoelectric element 10 and a driving shaft 20. And, the piezoelectric element 10 is expanded and contracted depending on the driving pulse applied and the one end of the driving shaft 20 is connected to the piezoelectric element 10, so that the driving force of the piezoelectric actuator can be transmitted to the lens barrel 40 as a driven member. The auto-focus apparatus includes a coupling means 30 for coupling the lens barrel 40 to the driving shaft 20. However, since the coupling means 30 includes a leaf spring 31 and a frictional member 32, the structure of the coupling means becomes very complex and thus the productivity decreases. Also, since the contact and support area between the coupling means and the driving shaft fixed to the coupling means is small, there is a problem of the lens barrel rotating or twisting when being driven.

Finally, in a camera module of the mobile telecommunication terminal according to the prior art, there is a problem because the auto-focus apparatus incorporates an elastic component (for example, spring) for securing and maintaining a preload between the driving member and the driven member, which makes the structure of the auto-focus apparatus complex and thus decreases productivity. In addition to this problem, another problem wherein the auto-focus apparatus cannot precisely control the position of a lens and the lens barrel rotates or twists when being driven, can take place.

SUMMARY OF THE INVENTION

Accordingly, the present invention has been made keeping in mind the above problems occurring in the related art, and the present invention is intended to propose a camera module having an auto-focus apparatus in which, since the lens barrel as a driven member is magnetically coupled to the rod which is adapted to move by the piezoelectric actuator, it is possible to easily assure the tilting performance of the lens while securing and maintaining a preload.

Also, the present invention is intended to propose a camera module having an auto-focus apparatus in which, since the tilting performance of lens can be assured by the magnetic force, a structure such as an additional guide member can be eliminated, and since the structure including driving components can be collectively mounted in one place, it is possible to reduce the overall size of the camera module.

Furthermore, the present invention is intended to propose a camera module having an auto-focus apparatus in which it is possible to automatically bring the camera module into focus by detecting the position of the lens barrel using the feedback system and controlling the driving operation of the piezoelectric actuator.

In addition, the present invention is intended to propose a camera module having an auto-focus apparatus in which, since the lens barrel is a driven member that is magnetically coupled to the rod which is adapted to move by the piezoelectric actuator, the miniaturization and automation of the camera module according can be achieved, and it is possible to easily secure and maintain a preload, and since the lens barrel is configured to move along the guide part, the lens barrel can correctly move without twisting or rotating when being driven, so that the tilting performance can be secured in a more effective manner.

In order to achieve the above objects, according to one aspect of the present invention, there is provided a camera module having an auto-focus apparatus comprising: a piezoelectric actuator configured to generate a force for moving a driven member; a rod connected to the piezoelectric actuator and configured to transmit the force of the piezoelectric actuator to the driven member; a lens barrel having at least one lens; and a connecting member configured to use magnetic force to couple the rod and the lens barrel together.

In an exemplary embodiment, the connecting member is composed of a magnet, the rod is composed of a magnetic body, and the rod is coupled to the connecting member by attractive force.

Preferably, the connecting member is inserted and coupled to the side portion of the lens barrel.

In addition, the connecting member is composed of a magnet and the lens barrel is provided at its one side with a prescribed part which is coupled to the connecting member and composed of a magnetic body, so that the lens barrel is coupled to the connecting member by an attractive force.

In an exemplary embodiment, the connecting member is inserted and coupled to the side part of the rod.

In particular, the connecting member is integrally formed on the prescribed part of the rod.

Furthermore, the camera module having an auto-focus apparatus further comprises a weight coupled to the piezoelectric actuator.

In another aspect, the present invention provides a camera module having an auto-focus apparatus and feedback system comprising: a piezoelectric actuator configured to generate a force for moving a driven member; a rod connected to the piezoelectric actuator and configured to transmit the force of the piezoelectric actuator to the driven member; a lens barrel having at least one lens; a connecting member configured to couple the rod and the lens barrel together by a magnetic force; a position detecting sensor configured to detect the position of the lens; a CPU configured to calculate the driving value of the piezoelectric actuator, based on a value of the signal detected by the position detecting sensor; and a driver IC configured to receive the driving value of the piezoelectric actuator calculated by the CPU and to control the driving operation of the piezoelectric actuator.

In an exemplary embodiment, the position detecting sensor is selected from the group consisting of PI (Photointerruptor), a Hall sensor and PSD (Position Sensitive Device).

Preferably, the connecting member is composed of a magnet, the rod is composed of a magnetic body, and the rod is coupled to the connecting member by an attractive force.

In addition, the connecting member is inserted and coupled to the side portion of the lens barrel.

In another exemplary embodiment, the connecting member is composed of a magnet and the lens barrel is provided at its one side with a prescribed part which is coupled to the connecting member and composed of a magnetic body, so that the lens barrel is coupled to the connecting member by an attractive force. Also, the connecting member is inserted and coupled to the side part of the rod. Preferably, the connecting member is integrally formed on the prescribed part of the rod.

In particular, the camera module having an auto-focus apparatus further comprises a weight coupled to the piezoelectric actuator.

In yet another aspect, the present invention provides a camera module having an auto-focus apparatus comprising: a piezoelectric actuator configured to generate a force for moving a driven member; a rod connected to the piezoelectric actuator and configured to transmit the force of the piezoelectric actuator to the driven member; a lens barrel having at least one lens; and a connecting member configured to couple the rod and the lens barrel together by a magnetic force. Herein, the connecting member is formed with a rod guide groove corresponding to the rod and the rod is inserted and coupled to the rod guide groove in a movable manner.

In an exemplary embodiment, the connecting member is composed of a magnet, the rod is composed of a magnetic body, and the rod is coupled to the connecting member by an attractive force.

Preferably, a coating layer for reinforcement anti-oxidization selectively coats the connecting member or the rod.

In addition, the connecting member is coupled to the side portion of the lens barrel. Furthermore, the lens barrel further includes a back-yoke which is coupled to a rear surface of the connecting member opposite to the lens barrel so as to prevent the dissipation of the magnetic force.

In an exemplary embodiment, the camera module having an auto-focus apparatus further comprises a weight coupled to the piezoelectric actuator so as to provide the force of the piezoelectric actuator in one direction.

In another aspect, the present invention provides a camera module having an auto-focus apparatus and feedback system comprising: a piezoelectric actuator configured to generate a force for moving a driven member; a rod connected to the piezoelectric actuator and configured to transmit the force of the piezoelectric actuator to the driven member; a lens barrel having at least one lens; a connecting member configured to couple the rod and the lens barrel together by a magnetic force; a position detecting sensor configured to detect the position of the lens; a CPU configured to calculate the driving value of the piezoelectric actuator, based on a value of the signal detected by the position detecting sensor; and a driver IC configured to receive the driving value of the piezoelectric actuator calculated by the CPU and to control the driving operation of the piezoelectric actuator. Herein, the connecting member is formed with a rod guide groove corresponding to the rod and the rod is inserted into the rod guide groove.

In an exemplary embodiment, the connecting member is composed of a magnet, the rod is composed of a magnetic body, and the rod is coupled to the connecting member by an attractive force.

Preferably, a coating layer for reinforcement anti-oxidization selectively coats the connecting member or the rod.

In addition, the lens barrel further includes a back-yoke which is coupled to a rear surface of the connecting member opposite to the lens barrel so as to prevent the dissipation of the magnetic force.

Particularly, the connecting member is coupled to the side portion of the lens barrel.

Furthermore, the position detecting sensor is selected from the group consisting of PI (Photointerruptor), a Hall sensor and PSD (Position Sensitive Device).

Preferably, the camera module having an auto-focus apparatus further comprises a weight coupled to the piezoelectric actuator so as to provide the force of the piezoelectric actuator in one direction.

BRIEF DESCRIPTION OF THE DRAWINGS

The above and other objects, other advantages, and features of the present invention will be more clearly understood from the following detailed description when taken in conjunction with the accompanying drawings, in which.

DETAILED DESCRIPTION OF THE INVENTION

Figure 1:
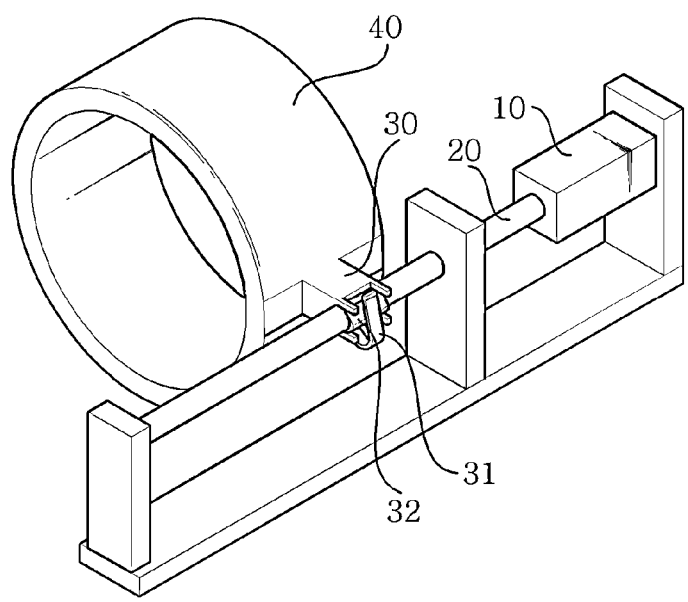
FIG. 1 is a perspective view diagrammatically illustrating an auto-focus apparatus of a camera module incorporating a piezoelectric actuator according to the prior art.

The characteristics and advantages of the present invention will be clearly described hereinbelow with reference to the accompanying drawings.

It should be understood that the terminology and words used in the specification and appended claims should not be construed in a fashion limited to general and dictionary meanings, but should be interpreted based on the meanings and concepts corresponding to technical aspects of the present invention on the basis of the principle that an inventor is allowed to define terms appropriately for the sake of the best explanation.

Reference will now be made in greater detail to a preferred embodiment of the invention, an example of which is illustrated in the accompanying drawings. Wherever possible, the same reference numerals will be used throughout the drawings and the description to refer to the same or like parts. It will be understood that although the terms "first," "second," "one side," "the other side," etc. may be used herein to describe various elements, these elements should not be limited by these terms. These terms are only used to distinguish one element from another element. In the following description, it is to be noted that, when the functions of conventional elements and the detailed description of elements related to the present invention may make the gist of the present invention unclear, a detailed description of those elements will be omitted.

The present invention relates to a camera module used in a piezoelectric terminal for mobile communication. The camera module includes a piezoelectric actuator capable of generating mechanical vibrations using the SIDM (Smooth Impact Drive Mechanism) method and transmits the mechanical vibrations to a lens barrel so as to perform A/F (Auto-Focus) function. In addition, the camera module according to the present invention can be brought into focus by generating a preload between the lens barrel and the piezoelectric actuator using magnetic force and then driving the lens.

Hereinafter, the camera module having an auto-focus apparatus according to the preferred embodiment of the present invention will be described in detail by referring to the accompanying drawings.

Figure 2:
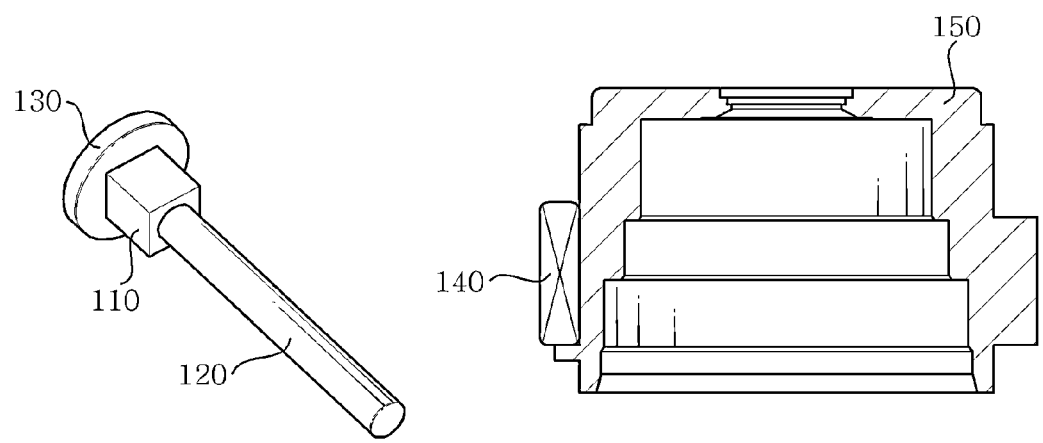
FIG. 2 is a configuration view diagrammatically illustrating the auto-focus apparatus of the camera module according to the first embodiment of the present invention.

FIG. 2 is a configuration view diagrammatically illustrating the auto-focus apparatus of the camera module according to the first embodiment of the present invention. As shown in FIG. 2, the auto-focus apparatus of the camera module includes a piezoelectric actuator 110, a rod 120, a lens barrel 150 and a connecting member 140.

And, as electric power is applied, the piezoelectric actuator 110 is expanded and contracted, and is configured to displace the lens barrel 150 as the driven member. The rod 120 transmits the force of the piezoelectric actuator 110 to the lens barrel 150 and has one end connected to the piezoelectric actuator 110. The lens barrel 150 includes at least one lens. The connecting member 140 is configured to couple the rod 120 and the lens barrel 150 using magnetic force.

More specifically, the connecting member 140 is composed of a magnet and is inserted and coupled to the side of lens barrel 150 opposite to the rod. The rod 120 is composed of a magnetic body so as to be coupled to the connecting member 140.

Figure 3:
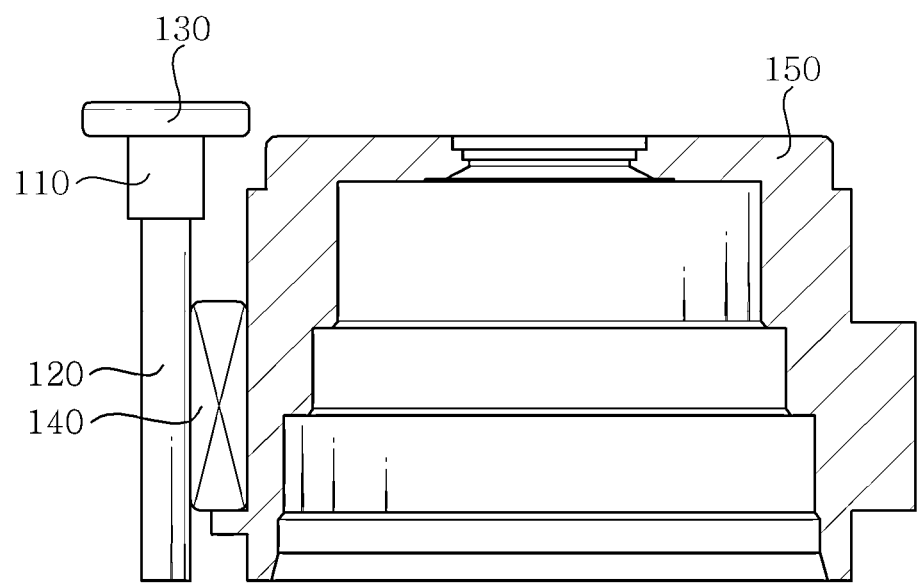
FIG. 3 is a configuration view diagrammatically illustrating an assembled state of the auto-focus apparatus shown in FIG. 2.

With these configurations, as shown in FIG. 3, the lens barrel 150 is connected to the rod 120 via the connecting member 140 by an attractive force, that is, a magnetic force, so that the lens barrel is subjected to a preload. And thus, the lens barrel is allowed to move by being interlocked with the rod 120 by the piezoelectric actuator 110.

Furthermore, as an alternative of the present invention, the connecting member 140 may be inserted and coupled to the side portion of the rod 120 or may be integrally formed on the prescribed portion of the rod 120. In this case, one side of the lens barrel 150 is provided with a prescribed part which is coupled to the connecting member and composed of a magnetic body, so that lens barrel is coupled to the connecting member by an attractive force.

In addition, in order to provide the force of the piezoelectric actuator in one direction, the auto-focus apparatus of the camera module according to the present invention may further include a weight 130 which is coupled to the other end opposite to the one end of the piezoelectric actuator 110 that the rod 120 is coupled to.

Figure 4:
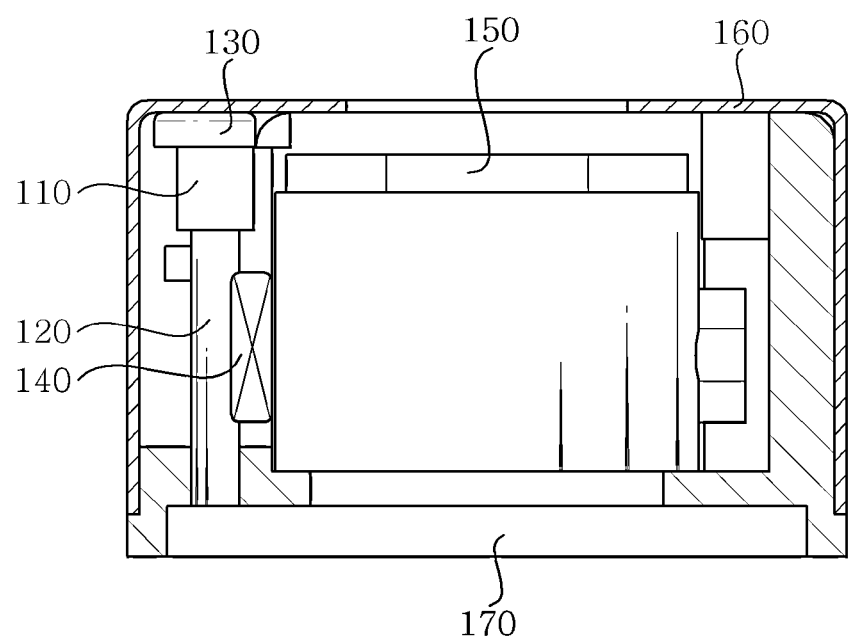
FIG. 4 is a configuration view diagrammatically illustrating the camera module having the auto-focus apparatus according to the first embodiment of the present invention.

FIG. 4 is a configuration view diagrammatically illustrating the camera module having the auto-focus apparatus according to the first embodiment of the present invention. As shown in FIG. 4, the camera module is illustrated in the state of the auto-focus apparatus shown in FIG. 3 being assembled to the camera module by a case 160 and a housing 170.

More specifically, the camera module includes the piezoelectric actuator 110, the rod 120, the weight 130, the connecting member 140, the lens barrel 150, the case 160 and the housing 170. And, since the rod 120 is composed of a magnetic body, the rod can be coupled to the connecting member 140 by an attractive force, which is composed of a magnet and is coupled to the lens barrel 150. The driving force generated by the piezoelectric actuator 110 is transmitted to the lens barrel 150 through the rod 120, so that the lens barrel 150 moves in the axial direction of the rod 120.

Further, the case 160 covers the piezoelectric actuator 110, the rod 120, the weight 130, the connecting member 140 and the lens barrel 150. The housing 170 is coupled to the lower portion of the lens barrel 150 and the case 160 is coupled to the housing 170.

Figure 5:
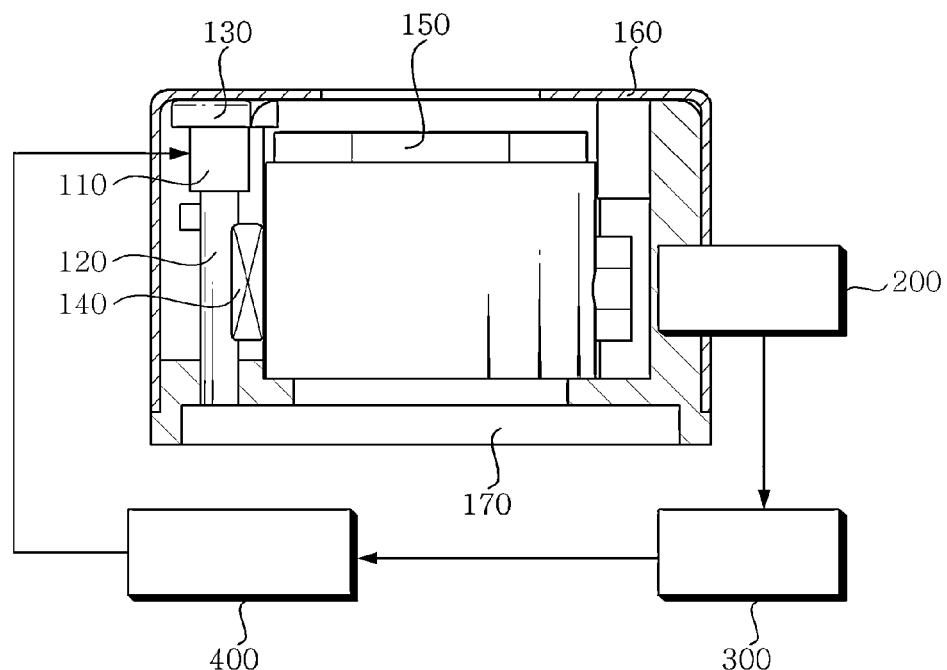
FIG. 5 is a configuration view diagrammatically illustrating the camera module having a feedback system and the auto-focus apparatus according to the first embodiment of the present invention.

FIG. 5 is a configuration view diagrammatically illustrating the camera module having a feedback system and the auto-focus apparatus according to the first embodiment of the present invention. As shown in FIG. 5, the auto-focus apparatus according to the present invention can displace a lens to a desired position by a feedback system. More specifically, the feedback system includes a position detecting sensor 200, a CPU 300 and a driver IC 400. Further, the position detecting sensor 200 is configured to detect the position of the lens. The CPU 300 is configured to calculate the driving value of the piezoelectric actuator, based on a value of the signal detected by the position detecting sensor. In addition, the driver IC 400 is configured to receive the driving value of the piezoelectric actuator calculated by the CPU 300 and to control the driving operation of the piezoelectric actuator.

Moreover, the position detecting sensor may be selected from the group consisting of PI (Photointerruptor), a Hall sensor and PSD (Position Sensitive Device).

With these configurations, since the lens barrel as a driven member is magnetically coupled to the rod which is adapted to move by the piezoelectric actuator, the camera module according to the present invention is easily capable of assuring the tilting performance of lens while securing and maintaining a preload. In this way, the tilting performance of lens can be assured by the magnetic force, so that a structure such as an addition guide member can be eliminated. Also, since the structure including driving components can be collectively mounted in one place, it is possible to reduce the overall size of the camera module. Furthermore, it is possible to automatically bring the camera module into focus by detecting the position of the lens barrel using the feedback system and controlling the driving operation of the piezoelectric actuator.

Figure 6:
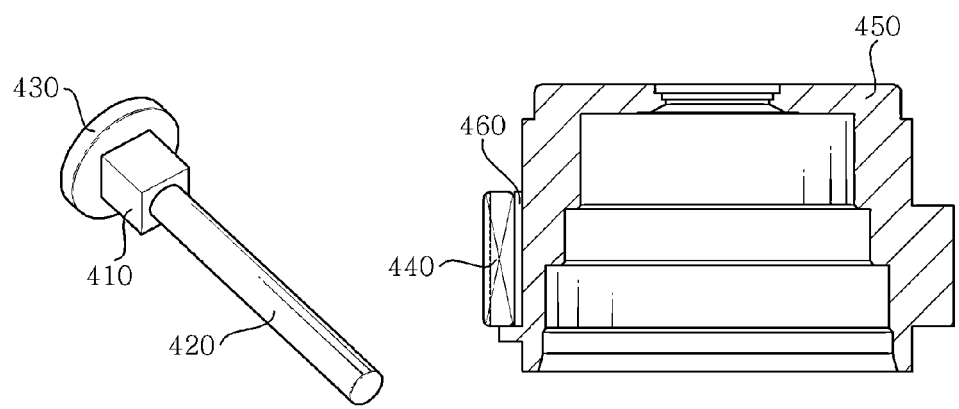
FIG. 6 is a configuration view diagrammatically illustrating the auto-focus apparatus of the camera module according to the second embodiment of the present invention.

FIG. 6 is a configuration view diagrammatically illustrating the auto-focus apparatus of the camera module according to the second embodiment of the present invention. As shown in FIG. 6, the auto-focus apparatus of the camera module includes a piezoelectric actuator 410, a rod 420, a weight 430, a connecting member 440 and a lens barrel 150.

Further, as electric power is applied, the piezoelectric actuator 410 is expanded and contracted, and is configured to displace the lens barrel 450 as the driven member. The rod 420 transmits the force of the piezoelectric actuator 410 to the lens barrel 450 and is connected to the piezoelectric actuator 410.

The weight 430 is configured to provide the force of the piezoelectric actuator 410 in one direction and is coupled to the piezoelectric actuator opposite to the rod 420 coupled to the piezoelectric actuator 410.

The lens barrel 450 includes at least one lens. The connecting member 440 is configured to couple the rod 420 and the lens barrel 450 using magnetic force.

In addition, the auto-focus of the camera module according to the second embodiment of the present invention may further include a back-yoke system 460. The back-yoke system 460 is coupled to a rear surface of the connecting member opposite to the lens barrel 450 so as to prevent the dissipation of the magnetic force. Also, it is preferable that the back-yoke system be composed of a Fe containing material for effectively preventing the dissipation of the magnetic force.

The connecting member 440 is composed of a magnet and is coupled to the side portion of the lens barrel 450 opposite to the rod 420. Also, the connecting member 440 is formed with rod guide groove 441 corresponding to the rod 420 and the rod 420 is inserted and coupled to the rod guide groove 441 in a movable manner. And, the rod 420 is composed of a magnetic body so as to be coupled with the connecting member 440.

Further, a coating layer (not shown) for reinforcement anti-oxidization is coated on one or both of the connecting member and the rod. The coating layer is a carbide film or nitride film formed by adding carbon or nitrogen into at least one metal which is selected the group consisting of ceramic, tungsten, titanium, chrome and aluminum.

Figure 7:
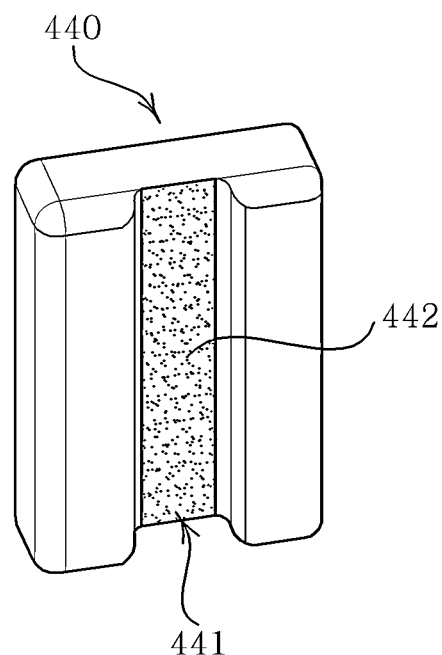
FIG. 7 is a perspective view diagrammatically illustrating a first embodiment of the connecting member which is used in the auto-focus apparatus according to the second embodiment of the present invention.

FIG. 7 is a perspective view diagrammatically illustrating a first embodiment of the connecting member which is used in the auto-focus apparatus according to the second embodiment of the present invention. As shown in FIG. 7, the rod guide groove 441 of the connecting member 440 may be formed into a polygonal shape. Also, a coating layer 452 for reinforcement anti-oxidization is coated on the connecting member.

Figure 8:
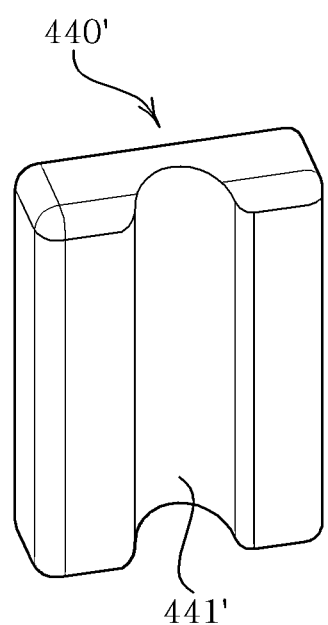
FIG. 8 is a perspective view diagrammatically illustrating a second embodiment of the connecting member which is used in the auto-focus apparatus according to the second embodiment of the present invention.

FIG. 8 is a perspective view diagrammatically illustrating a second embodiment of the connecting member which is used in the auto-focus apparatus according to the second embodiment of the present invention. As shown in FIG. 8, the rod guide groove 441' of the connecting member 440' can be formed into a semi-circular shape. Alternatively, the shape of the rod guide may be variously changed into an elliptic, triangular, rectangular or pentagonal shape, and these changes are intended to be included within the scope of the present invention.

Figure 9:
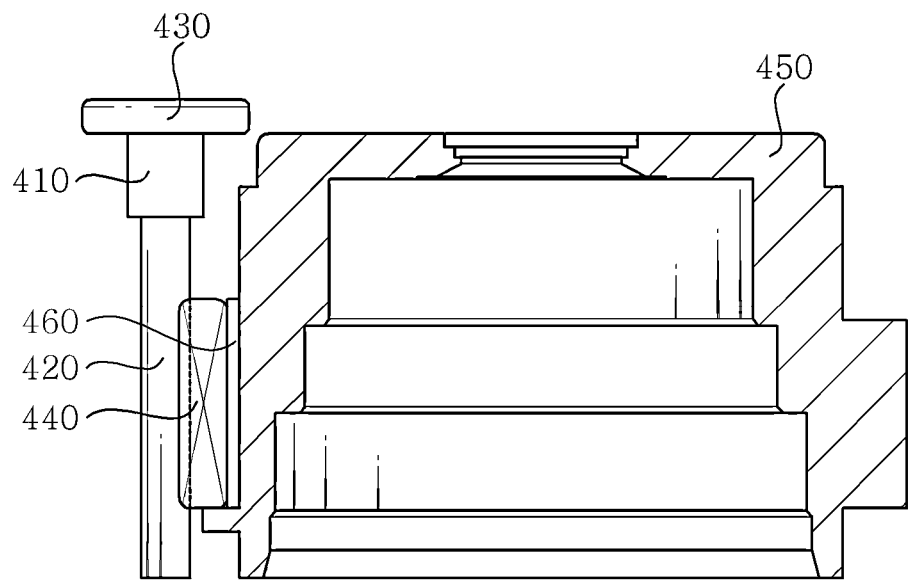
FIG. 9 is a configuration view diagrammatically illustrating an assembled state of the auto-focus apparatus according to the second embodiment of the present invention.
Figure 10:
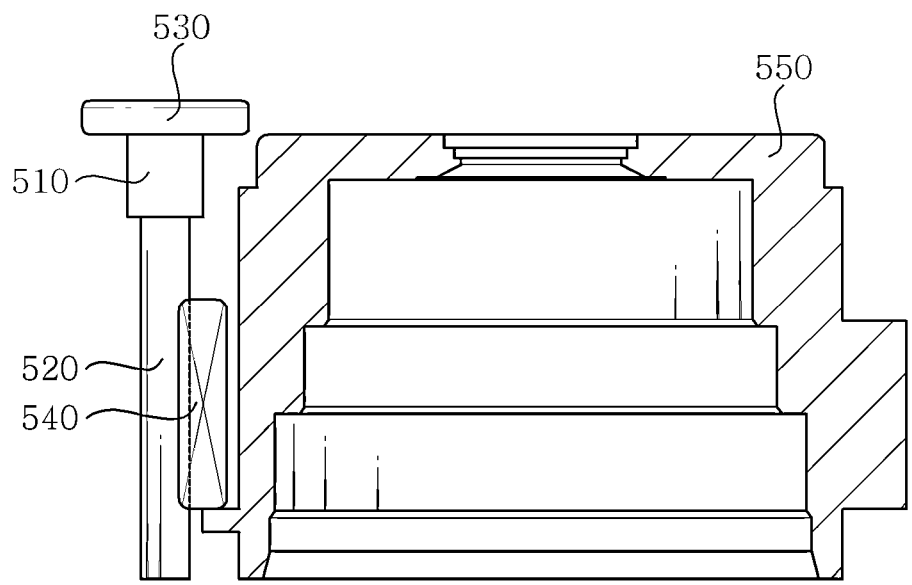
FIG. 10 is a configuration view diagrammatically illustrating the auto-focus apparatus of the camera module according to the third embodiment of the present invention.

FIG. 9 is a configuration view diagrammatically illustrating an assembled state of the auto-focus apparatus according to the second embodiment of the present invention, and FIG. 10 is a configuration view diagrammatically illustrating the auto-focus apparatus of the camera module according to the third embodiment of the present invention. As shown in FIG. 9, the auto-focus apparatus of the camera module according to the second embodiment of the present invention may include a back-yoke. Also, as shown in FIG. 9, the auto-focus apparatus of the camera module according to the third embodiment of the present invention may not include a back-yoke.

As shown in FIG. 9, the lens barrel 450 is connected to the rod 420 via the connecting member 440 by an attractive force, that is, a magnetic force, so that the lens barrel is subjected to a preload. And thus, the lens barrel 450 is allowed to move by being interlocked with the rod 420 by the piezoelectric actuator 410. In addition, the rod 420 is configured to move along the rod guide groove 441 while being inserted therein. Accordingly, rotational movement or other movement except for movement along the rod guide groove can be restricted, so that the lens barrel 450 can constantly move along the rod guide groove without twisting or rotating when being driven.

Figure 11:
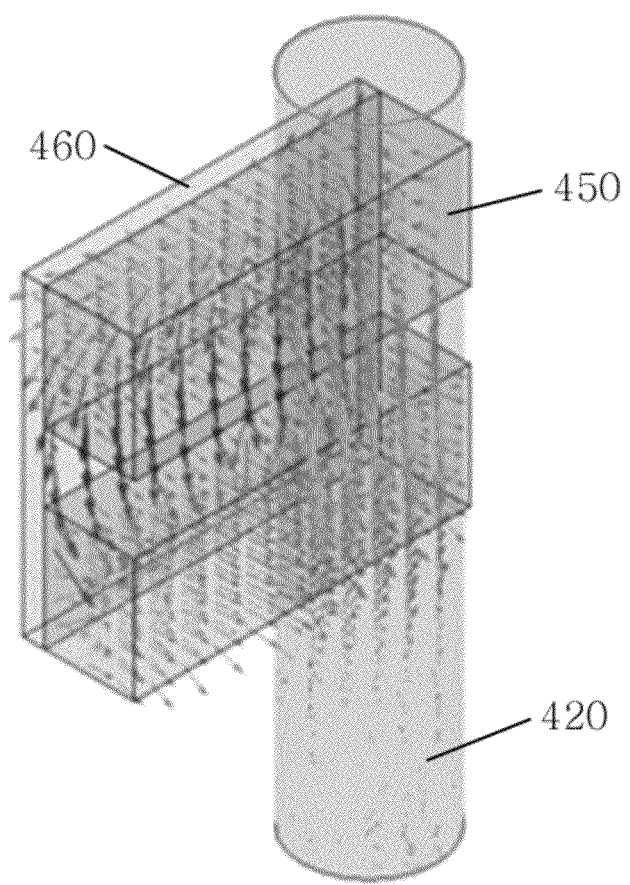
FIG. 11 is an analyzing view diagrammatically illustrating a result of performing magnetic analysis on the auto-focus apparatus shown in FIG. 9.

FIG. 11 is an analyzing view diagrammatically illustrating a result of performing magnetic analysis on the auto-focus apparatus shown in FIG. 9. More specifically, the connecting member 420 is coupled at one side to the rod and is composed of a magnet, and the back-yoke 460 is coupled to the other side opposite to the one side of the connecting member. Therefore, it is found that, using the back-yoke 460 causes the magnet of the connecting member 440 to prevent the magnetic force from being discharged and dissipated.

Figure 12:
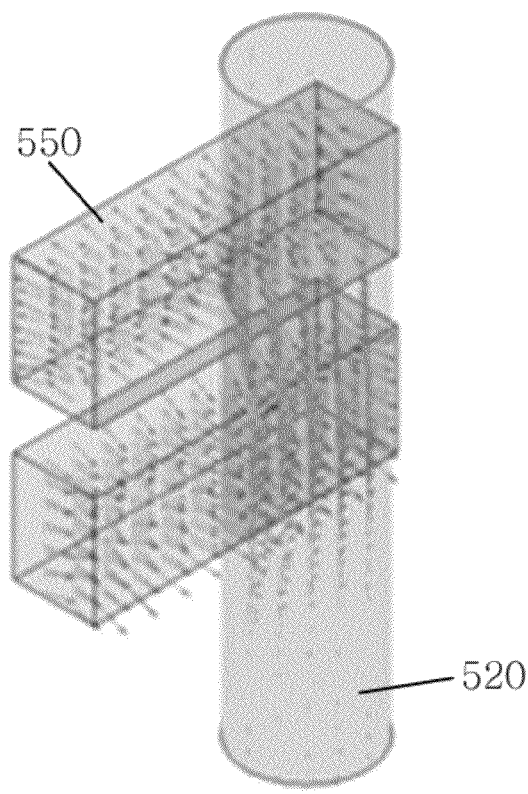
FIG. 12 is an analyzing view diagrammatically illustrating a result of performing magnetic analysis on the auto-focus apparatus shown in FIG. 10.

FIG. 12 is an analyzing view diagrammatically illustrating a result of performing magnetic analysis on the auto-focus apparatus shown in FIG. 10. As shown in FIG. 12, from the magnetic analysis result for the auto-focus apparatus without the back-yoke, it can be shown that, by forming a groove in the connecting member 540 which is coupled to the rod 520 and is composed of a magnet, the contact area between the rod and the connecting member increases and the strength of the magnetic force at the contact area becomes larger.

Figure 13:
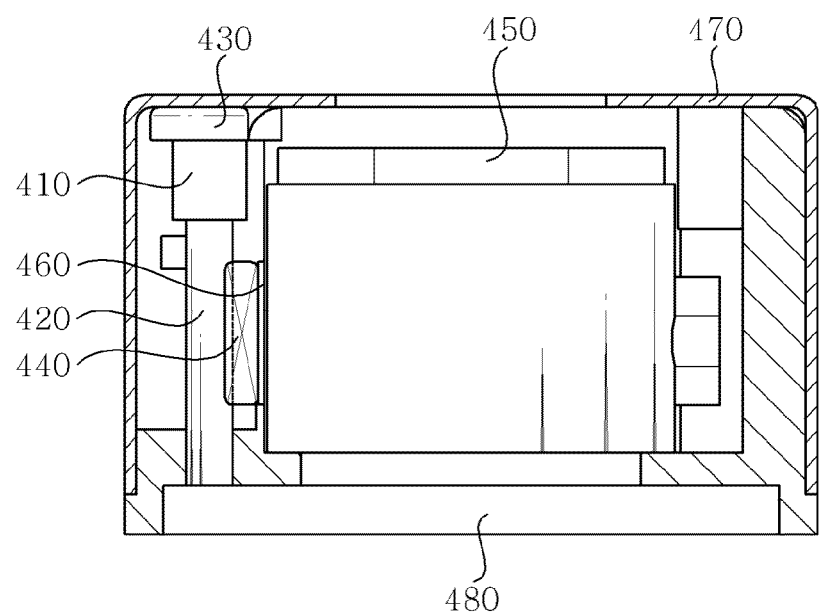
FIG. 13 is a configuration view diagrammatically illustrating the camera module having the auto-focus apparatus according to the second embodiment of the present invention.

FIG. 13 is a configuration view diagrammatically illustrating the camera module having the auto-focus apparatus according to the second embodiment of the present invention. In FIG. 13, the camera module is illustrated in a state where the auto-focus apparatus shown in FIG. 9 is assembled to the camera module by a case 470 and a housing 480. The camera module includes the piezoelectric actuator 410, the rod 420, the weight 430, the lens barrel 450, the connecting member 440, the back-yoke 460, the case 470 and the housing 480. And, the rod 420 and the connecting member 440 which is composed of a magnet are coupled together by an attractive force. The driving force generated from the piezoelectric actuator 410 is transmitted to the lens barrel 450 by the rod 420, so that the lens barrel 450 moves in the axial direction of the rod 420. In addition, since the rod 420 is configured to move along the rod guide groove 441 of the connecting member 440 while being inserted therein, the lens barrel 450 can constantly move along the rod guide groove without twisting or rotating when being driven.

Further, the case 470 covers the piezoelectric actuator 410, the rod 420, the weight 430, the lens barrel 450, the connecting member 440 and the back-yoke 460. The housing 480 is coupled to the lower portion of the lens barrel and the case 470 is coupled to the housing 480.

Figure 14:
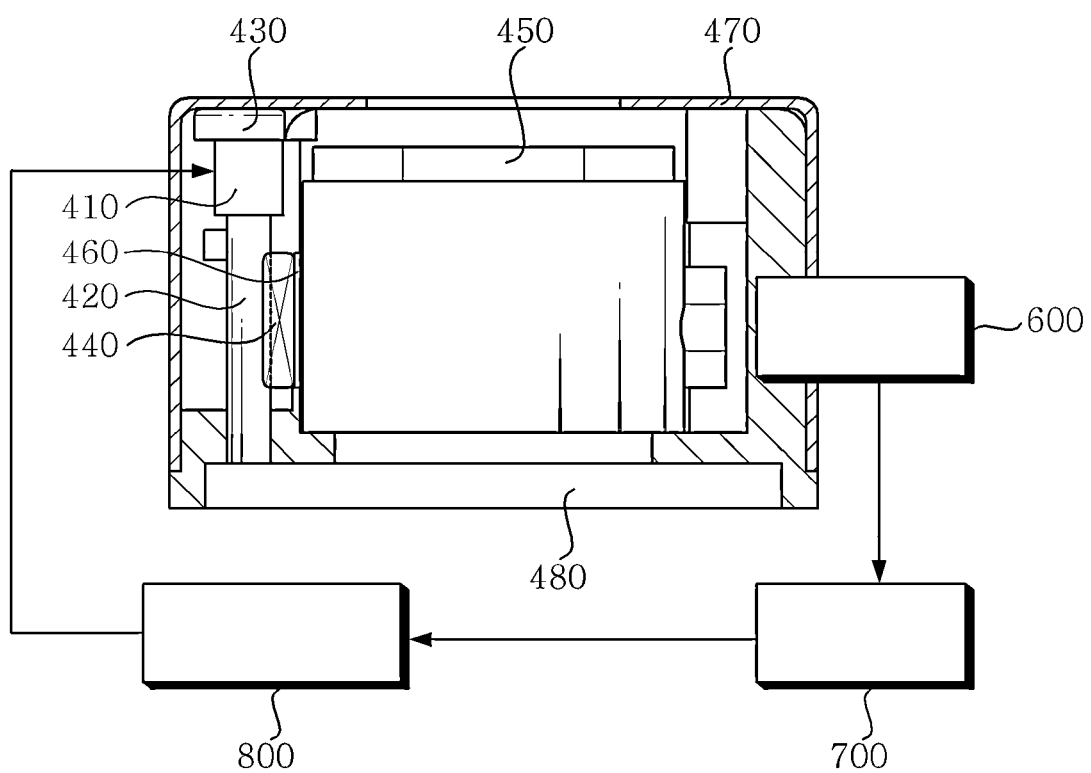
FIG. 14 is a configuration view diagrammatically illustrating the camera module having a feedback system and the auto-focus apparatus according to the second embodiment of the present invention.

FIG. 14 is a configuration view diagrammatically illustrating the camera module having a feedback system and the auto-focus apparatus according to the second embodiment of the present invention. As shown in FIG. 14, the auto-focus apparatus according to the present invention can displace a lens to a desired position by a feedback system. More specifically, the feedback system includes a position detecting sensor 600, a CPU 700 and a driver IC 800. Further, the position detecting sensor 600 is configured to detect the position of the lens. The CPU 700 is configured to calculate the driving value of the piezoelectric actuator, based on a value of the signal detected by the position detecting sensor. In addition, the driver IC 800 is configured to receive the driving value of the piezoelectric actuator calculated by the CPU 700 and to control the driving operation of the piezoelectric actuator.

Moreover, the position detecting sensor may be selected from the group consisting of PI (Photointerruptor), a Hall sensor and PSD (Position Sensitive Device).

As in the explanation of the first embodiment, the camera module having a feedback system and the auto-focus apparatus according to the second embodiment of the present invention may or may not include the back-yoke.

With these configurations, since the lens barrel as a driven member is magnetically coupled to the rod which is adapted to move by the piezoelectric actuator, the miniaturization and automation of the camera module according to the present invention can be achieved. Also, the camera module is easily capable of securing and maintaining a preload. Further, since the lens barrel is configured to move along the guide part, the lens barrel can correctly move without twisting or rotating when being driven. Therefore, it is possible to secure the tilting performance in more effective manner. Furthermore, it is possible to automatically bring the camera module into focus by detecting the position of the lens barrel using the feedback system and controlling the driving operation of the piezoelectric actuator.

As is apparent from the above description, the camera module having an auto-focus apparatus according to the present invention provides advantages in that, since the lens barrel as a driven member is magnetically coupled to the rod which is adapted to move by the piezoelectric actuator, the camera module is easily capable of assuring the tilting performance of the lens while securing and maintaining a preload. In this way, the tilting performance of the lens can be assured by the magnetic force, so that a structure such as an additional guide member can be eliminated. Also, since the structure including driving components can be collectively mounted in one place, it is possible to reduce the overall size of the camera module. Furthermore, it is possible to automatically bring the camera module into focus by detecting the position of the lens barrel using the feedback system and controlling the driving operation of the piezoelectric actuator.

According to the camera module of the present invention, since the lens barrel as a driven member is magnetically coupled to the rod which is adapted to move by the piezoelectric actuator, the miniaturization and automation of the camera module according can be achieved. Also, the camera module is easily capable of securing and maintaining a preload. Further, since the lens barrel is configured to move along the guide part, the lens barrel can correctly move without twisting or rotating when being driven. Therefore, it is possible to secure the tilting performance in more effective manner.

Although the present invention has been described for illustrative purposes by referring to specific embodiments, the camera module having an auto-focus apparatus according to the present invention is not limited to the specific embodiments. Those skilled in the art will appreciate that various modifications and variations of the present invention may be derived within the technical spirit of the present invention.

The simple modifications and variations of the present invention are fall within the scope of the present invention, and the specific scope of the present invention will be established by the appended claims.

What is claimed is:

1. A camera module having an auto-focus apparatus comprising:
a piezoelectric actuator configured to generate a force for moving a driven member;
a rod connected to the piezoelectric actuator and configured to transmit the force of the piezoelectric actuator to the driven member;
a lens barrel having at least one lens; and
a connecting member configured to couple the rod and the lens barrel together by a magnetic force,
wherein the connecting member is formed with a rod guide groove corresponding to the rod and the rod is inserted and coupled to the rod guide groove in a movable manner.

2. The camera module having the auto-focus apparatus as set forth in claim 1, wherein the connecting member is composed of a magnet, the rod is composed of a magnetic body, and the rod is coupled to the connecting member by an attractive force.

3. The camera module having the auto-focus apparatus as set forth in claim 2, wherein a coating layer for reinforcement anti-oxidization is selectively coated on the connecting member or the rod.

4. The camera module having the auto-focus apparatus as set forth in claim 1, wherein the connecting member is coupled to a side portion of the lens barrel.

5. The camera module having the auto-focus apparatus as set forth in claim 1, wherein the lens barrel further includes a back-yoke which is coupled to a rear surface of the connecting member opposite to the lens barrel so as to prevent the magnetic force from dissipating.

6. The camera module having the auto-focus apparatus as set forth in claim 1, further comprising a weight coupled to the piezoelectric actuator so as to provide the force of the piezoelectric actuator in one direction.

7. A camera module having an auto-focus apparatus comprising:
a piezoelectric actuator configured to generate a force for moving a driven member;
a rod connected to the piezoelectric actuator and configured to transmit the force of the piezoelectric actuator to the driven member;

a lens barrel having at least one lens;

a connecting member configured to couple the rod and the lens barrel together by a magnetic force;

a position detecting sensor configured to detect the position of the lens;

a CPU configured to calculate the driving value of the piezoelectric actuator, based on a value of the signal detected by the position detecting sensor; and a driver IC configured to receive the driving value of the piezoelectric actuator calculated by the CPU and to control driving of the piezoelectric actuator, wherein the connecting member is formed with a rod guide groove corresponding to the rod and the rod is inserted into the rod guide groove.

8. The camera module having the auto-focus apparatus as set forth in claim 7, wherein the connecting member is composed of a magnet, the rod is composed of a magnetic body, and the rod is coupled to the connecting member by an attractive force.

9. The camera module having the auto-focus apparatus as set forth in claim 8, wherein a coating layer for reinforcement anti-oxidization is selectively coated on the connecting member or the rod.

10. The camera module having the auto-focus apparatus as set forth in claim 7, wherein the lens barrel further includes a back-yoke which is coupled to a rear surface of the connecting member opposite to the lens barrel so as to prevent the magnetic force from dissipating.

11. The camera module having the auto-focus apparatus as set forth in claim 7, wherein the connecting member is coupled to a side portion of the lens barrel.

12. The camera module having the auto-focus apparatus as set forth in claim 7, wherein the position detecting sensor is selected from the group consisting of PI (Photointerruptor), a Hall sensor and PSD (Position Sensitive Device).

13. The camera module having the auto-focus apparatus as set forth in claim 7, further comprising a weight coupled to the piezoelectric actuator so as to provide the force of the piezoelectric actuator in one direction.

* * * * *